United States Patent
Karrai et al.

(10) Patent No.: US 8,773,666 B2
(45) Date of Patent: Jul. 8, 2014

(54) DEVICE AND METHOD FOR ACQUIRING POSITION WITH A CONFOCAL FABRY-PEROT INTERFEROMETER

(75) Inventors: Khaled Karrai, Munich (DE); Pierre-Francois Braun, Munich (DE)

(73) Assignee: Attocube Systems AG, Munich (DE)

( * ) Notice: Subject to any disclaimer, the term of this patent is extended or adjusted under 35 U.S.C. 154(b) by 488 days.

(21) Appl. No.: 13/022,901

(22) Filed: Feb. 8, 2011

(65) Prior Publication Data
US 2011/0211199 A1 Sep. 1, 2011

(30) Foreign Application Priority Data

Feb. 9, 2010 (EP) ..................................... 10153054

(51) Int. Cl.
*G01B 11/02* (2006.01)
*G01B 9/02* (2006.01)
(52) U.S. Cl.
USPC .......................................... 356/506; 356/480
(58) Field of Classification Search
USPC ........................... 356/480, 482, 519, 505, 506
See application file for complete search history.

(56) References Cited

U.S. PATENT DOCUMENTS

| | | | |
|---|---|---|---|
| 7,782,465 B2 * | 8/2010 | Gibler et al. ................... | 356/480 |
| 7,898,731 B2 * | 3/2011 | Sharping et al. .............. | 359/330 |
| 8,045,175 B2 * | 10/2011 | De Groot et al. ............. | 356/497 |
| 8,340,143 B2 * | 12/2012 | Fan et al. ........................ | 372/18 |
| 2006/0274323 A1 * | 12/2006 | Gibler et al. ................... | 356/506 |
| 2009/0225325 A1 * | 9/2009 | Lopushansky et al. ....... | 356/480 |

FOREIGN PATENT DOCUMENTS

| | | |
|---|---|---|
| DE | 4018998 A1 | 1/1992 |
| EP | 2045572 A1 | 4/2009 |
| JP | 2001-318081 | 11/2001 |
| JP | 2006-84392 | 3/2006 |
| JP | 2007-517194 | 6/2007 |
| WO | 83/03010 A1 | 9/1983 |
| WO | WO 2009/043421 A1 | 4/2009 |

OTHER PUBLICATIONS

Japanese Office Action mailed Jan. 29, 2013 for corresponding Japanese Application No. 2011-026084.
"Micro Fabry-Perot sensor for surface measurement" by Andrei Brunfeld et al., Proc. Spie, Bd. 7603, 2008, pp. 7063U-12, XP002585702.
English Translation of the European Search Report dated Jun. 23, 2010 issued in corresponding EP 10 153 054.1.

* cited by examiner

*Primary Examiner* — Gregory J Toatley
*Assistant Examiner* — Shawn Decenzo (57) ABSTRACT

Device and method for acquiring position with a confocal Fabry-Perot interferometer. In a general aspect, the device for acquiring position may include an arrangement for acquiring position where the acquiring arrangement has a confocal Fabry-Perot interferometer. In another general aspect, a method for acquiring position may include generating an interference pattern dependent on a position of an object by a confocal Fabry-Perot interferometer; detecting the interference pattern to obtain a measuring signal; and evaluating the measuring signal.

18 Claims, 8 Drawing Sheets

DEVICE AND METHOD FOR ACQUIRING POSITION WITH A CONFOCAL FABRY-PEROT INTERFEROMETER

CROSS-REFERENCE TO RELATED APPLICATIONS

This application claims the priority benefit under 35 U.S.C. §119(a) from European Patent Application No. 10 153 054.1, filed on Feb. 9, 2010, in the European Intellectual Property Office, the disclosure of which is incorporated herein by reference in its entirety.

BACKGROUND

1. Field

The present disclosure relates to a device determining the position of an object or a path of the object, and more particularly, to devices and a method for acquiring position with a confocal Fabry-Perot interferometer.

2. Description of the Related Art

In many fields of application, it is required to acquire the position of an object or a path covered by the object. By way of example, positions of objects must be monitored and evaluated in materials-handling technology and automation. A specific field of use in which the accuracy of the positioning acquisition is particularly important is a positioning technology, where an object is moved in a targeted and defined fashion. Such positioners are used, for example, in research and industry. In addition to accuracy and a large measuring range, properties, such as insensitivity to vibration, robustness, and compactness of the design, are also important in practical use.

A Fabry-Perot interferometer may be used as a detector in a device for acquiring position. The device permits an accurate acquisition of position and/or measurement of path length. However, the mirror parallelism of the Fabry-Perot interferometer resonator is subjected to high demands which can increase the construction costs and the outlay on mounting. Such limitations can restrict the field of use and limit the measuring range of the device.

SUMMARY

It has been realized that what is needed in order to solve such limitations is to provide a device and a method for acquiring position which can both be used cost effectively and in manifold applications.

In one general aspect, a device for acquiring position may include means for acquiring position where the acquiring means having a confocal Fabry-Perot interferometer. In accordance with one embodiment the confocal Fabry-Perot interferometer may include a first and a second resonator reflective surfaces; and a folding reflective surface arranged in a beam path between the first and the second resonator reflective surfaces.

In another general aspect, a method for acquiring position may include generating an interference pattern dependent on a position of an object by means of a confocal Fabry-Perot interferometer; detecting the interference pattern to obtain a measuring signal; and evaluating the measuring signal.

The embodiments can be implemented to realize one or more of the following advantages. For example, the embodiments can be implemented to provide a simple and cost effective design of the device. Also, there may be less outlay on adjustment when installing the device in its installation environment, for example, a positioner. Moreover, the device can be used in installation environments with unfavorable preconditions (vibrations, a small installation space), and this may render a multiplicity of applications for the device.

The embodiments may also be implemented to provide a device with an extremely large measuring range, a high accuracy of the position determination. In addition, the embodiments may also be implemented to enable a device to be structurally compact and stable in a conceivably cost effective and a simple way.

This general and specific description can be implemented using an apparatus, a method, a system, or any combination of those. The details of one or more implementations are set forth in the accompanying drawings and the description below. Further, features, aspects, and advantages will become apparent from the description, the drawings, and the claims.

BRIEF DESCRIPTION OF THE DRAWINGS

The embodiment is explained in more detail below in an exemplary way with the aid of the figures of which.

DESCRIPTION OF EMBODIMENTS

Figure 1:
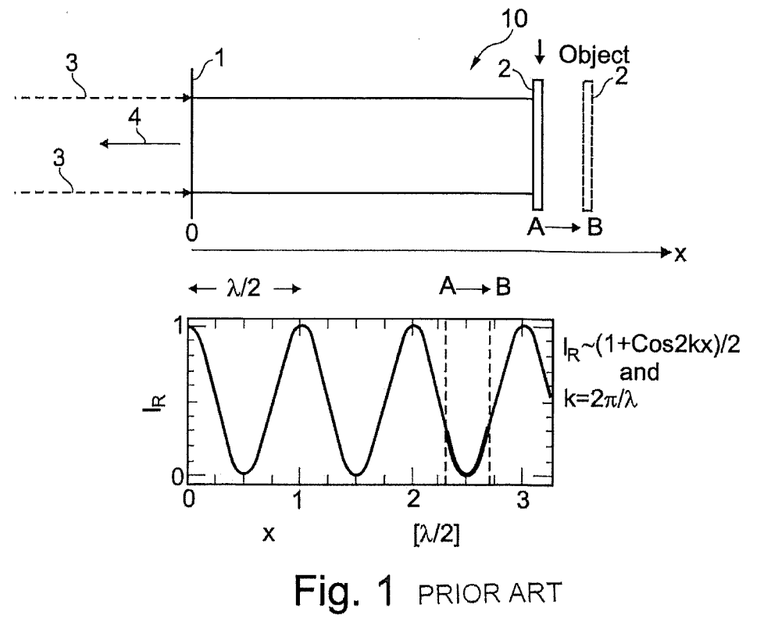
FIG. 1 is a diagrammatic illustration of the principle of a Fabry-Perot interferometer.

FIG. 1 illustrates the principle design of a Fabry-Perot interferometer 10. The latter comprises a first resonator mirror 1 and a second resonator mirror 2, which form an optical resonator with one another. The first resonator mirror 1 is semi-transparent and retroreflects a portion of the incident light 3. The other portion traverses the resonator, is reflected at the second resonator mirror 2 and is partially passed by the first resonator mirror 1. The light reflected by the Fabry-Perot interferometer thus results from a superimposition of the light reflected by the resonator mirror 2 on the light reflected by the resonator mirror 1.

By measuring the intensity of the reflected light 4, it is possible to determine the mirror spacing or a change in the mirror spacing. A diagram in the lower part of FIG. 1 illustrates the intensity $I_R$ of the reflected light 4 in a plot against a displacement path x, in units of half the wavelength $\lambda/2$ of the measuring light of wavelength $\lambda$. If the two flat resonator mirrors 1, 2 have low reflection factors which are approximately of equal magnitude, this results in a simple relationship for the intensity $I_R$, $I_R \sim (1-\cos 2kx)/2$, $k=2\pi/\lambda$. A path displacement, for example of the second resonator mirror 2 from the point A to the point B therefore effects a change in the intensity $I_R$ of the reflected light 4, as is illustrated in the lower part of FIG. 1. Since the wavelength $\lambda$ of the measuring light is known, it is possible by measuring the intensity $I_R$ of the reflected light to determine the displacement of the resonator mirror 2 of A to B, and thus the change in the length of the resonator of the Fabry-Perot interferometer.

Figure 2:
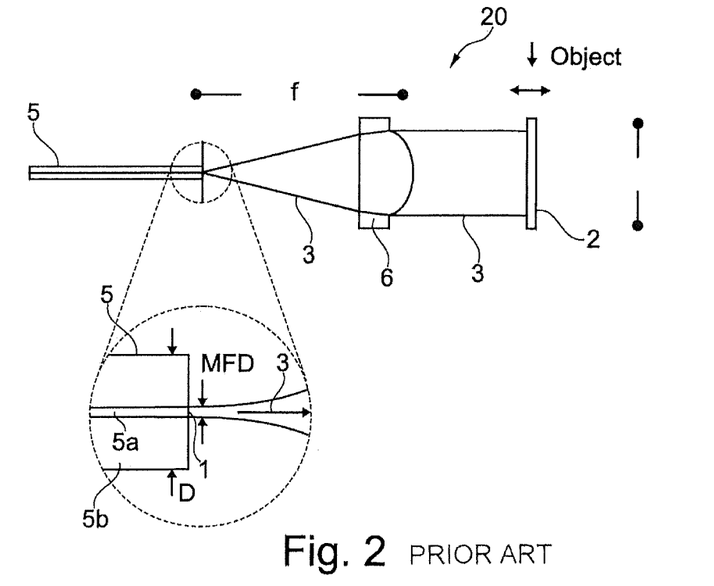
FIG. 2 is a diagrammatic representation of a Fabry-Perot interferometer without confocal optics.

FIG. 2 shows a Fabry-Perot interferometer 20 which is based on the principle explained with the aid of FIG. 1. The measuring light is guided to the Fabry-Perot interferometer 20 by means of an optical fibre 5. The optical fibre 5 comprises a core 5a and a cladding 5b surrounding the core 5a. The cladding 5b has a (slightly) smaller reflective index than the core 5a. The measuring light 3 emerges from the polished end of the optical fibre 5 and is focused by a collimator 6 into a parallel light beam 3. The parallel light beam 3 falls onto the second resonator mirror 2, is retroreflected from the latter to the collimator 6 and focused by the collimator 6 and led back into the optical fibre 5. The lens plane of the collimator 6 is located for this purpose at a spacing f (focal length of the collimator 6) from the exit surface of the optical fibre 5.

The first resonator mirror 1 is formed by the light exit surface of the core 5a in the case of the implementation of a Fabry-Perot interferometer 20 illustrated in FIG. 2. The resonator of the Fabry-Perot interferometer is therefore located between the light exit surface of the core 5a and the second resonator mirror 2, which is coupled to the object (not illustrated) in a variable position.

The Fabry-Perot interferometer 20 functions only when the light retroreflected by the second resonator mirror 2 is coupled again into the core 5a of the optical fibre 5 after focusing by the collimator 6. The condition for this is that the second resonator mirror 2 is aligned with high accuracy in a fashion perpendicular to the optical axis of the Fabry-Perot interferometer 20, and this alignment is retained even given a movement of the second resonator mirror 2. In structural terms, this condition can only be fulfilled with difficulty given an object movement, and in any case necessitates a high outlay on adjustment. This may be recognized with the aid of a simple exemplary calculation: the diameter of the core 5a at the exit surface (that is to say the diameter of the first resonator mirror 1) is denoted by MFD (Mode Field Diameter). The tilt $\alpha$ of the second resonator mirror 2 relative to its ideal position must fulfill the condition $\alpha \ll MFD/(4f)$ so that the light reflected by the second resonator mirror 2 is guided back into the core 5a, and so interference patterns can occur in the reflected light 4. Given MFD=10 µm and f=10 mm, the result is $\alpha \ll 0.25$ mRAD. The same value would result given MFD=5 µm and f=5 mm, for example. In order to fulfill this condition, the second resonator mirror 2 must be fitted on an expensive precision holder, and a perfectly tilt-free translation movement of the second resonator mirror 2 must be ensured. In practice, this cannot be achieved, or can be only with a high outlay.

A further characteristic of a Fabry-Perot interferometer is the contrast of the interference pattern present in the reflected light 4. Said contrast is to be as large as possible, and is optimally 100%. The contrast is expressed by the equation $$\text{contrast} = \frac{R_{max} - R_{min}}{R_{max}} \quad (1)$$

Here, $R_{min}$ and $R_{max}$ are given by the expressions $$R_{min} = \frac{R_1 + R_2 - 2\sqrt{R_1 R_2}}{\left(1 - \sqrt{R_1 R_2}\right)^2} \quad (2)$$

and $$R_{max} = \frac{R_1 + R_2 + 2\sqrt{R_1 R_2}}{\left(1 + \sqrt{R_1 R_2}\right)^2} \quad (3)$$

$R_1$ denoting the reflection factor of the first resonator mirror, and $R_2$ the reflection factor of the second resonator mirror. It follows from the equations that a maximum contrast is attained for $R_1=R_2$, since it holds in this case that $R_{min}=0$. This means that for the Fabry-Perot interferometer 20 illustrated in FIG. 2, in the case of which the first resonator mirror 1 is formed by a polished glass end surface with a relatively low reflection factor $R_1$, even the reflection factor $R_2$ of the second resonator mirror 2 should be comparably small. For example, the reflection factor of the two mirrors 1, 2 can be less than 0.15, in particular less than 0.07, and can amount, for example, to $R_1=R_2\approx 0.04$ of polished glass.

Figure 3:
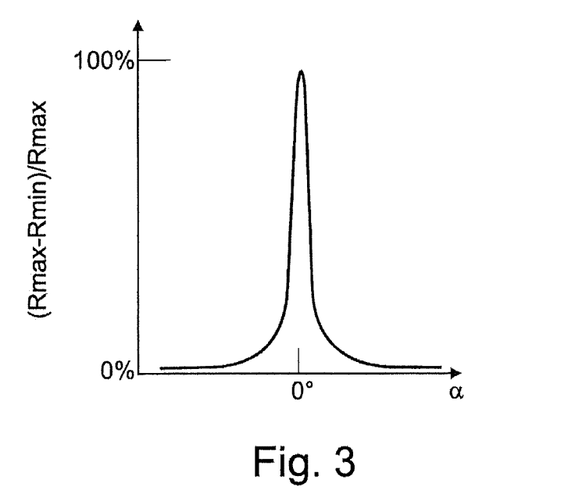
FIG. 3 is a graph illustrating the interference pattern contrast generated by the Fabry-Perot interferometer.

FIG. 3 shows the contrast of the Fabry-Perot interferometer 20 given $R_1=R_2$ as a function of the tilt angle $\alpha$. As already explained, the interferometer is functional only in a very narrow permitted range of the tilt angle $\alpha$.

Figure 4:
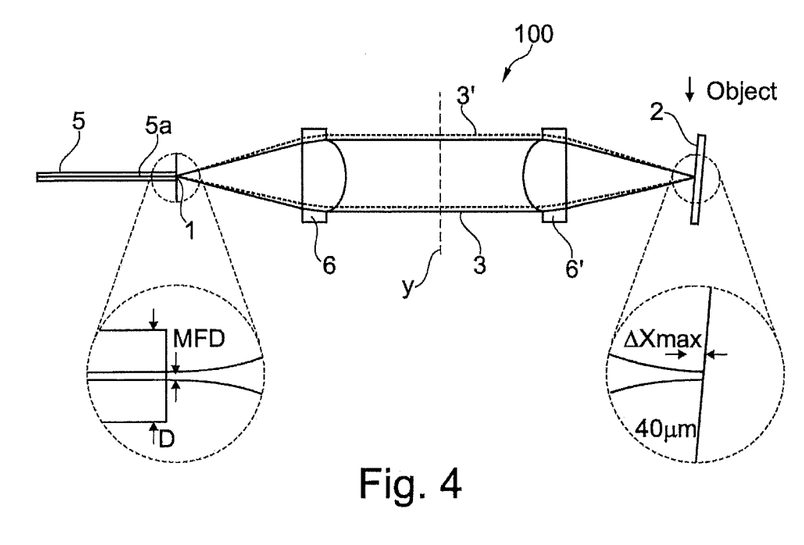
FIG. 4 is a diagrammatic illustration of an exemplary embodiment of a confocal Fabry-Perot interferometer.

According to the embodiment, a confocal Fabry-Perot interferometer may be used in order to overcome the adjustment problem, explained with the aid of FIG. 3, of a non-confocal Fabry-Perot interferometer 20. FIG. 4 shows a first exemplary embodiment of a confocal Fabry-Perot interferometer 100 for determining position. As in the preceding figures, identical or similar parts are denoted by the same reference symbols. The Fabry-Perot interferometer 100 illustrated in FIG. 4 differs from the Fabry-Perot interferometer 20 illustrated in FIG. 2 in that there is accommodated in the resonator a second collimator 6', which focuses the light beam 3 generated by the first collimator 6 onto the second resonator mirror 2. Even if, as illustrated in FIG. 4, the latter is tilted, the light 3' reflected by the second resonator mirror 2 may be retroreflected again exactly into the core 5a of the optical fibre 5 after traversing the two collimators 6' and 6. The second collimator 6' can have the same focal length f as the first collimator 6. Thus, the confocal optics 6, 6' may eliminate the problems (high outlay on apparatus, difficult adjustment) described in conjunction with a mirror tilting.

The Fabry-Perot interferometer 100 has a relatively small measuring range $\Delta x_{max}$, since the latter is restricted by the depth of field of the focus on the second resonator mirror 2. In practice, the measuring range is restricted to approximately 40 µm, for example. Relatively large displacement paths therefore cannot be acquired with the aid of the Fabry-Perot interferometer 100 shown in FIG. 4.

Figure 5:
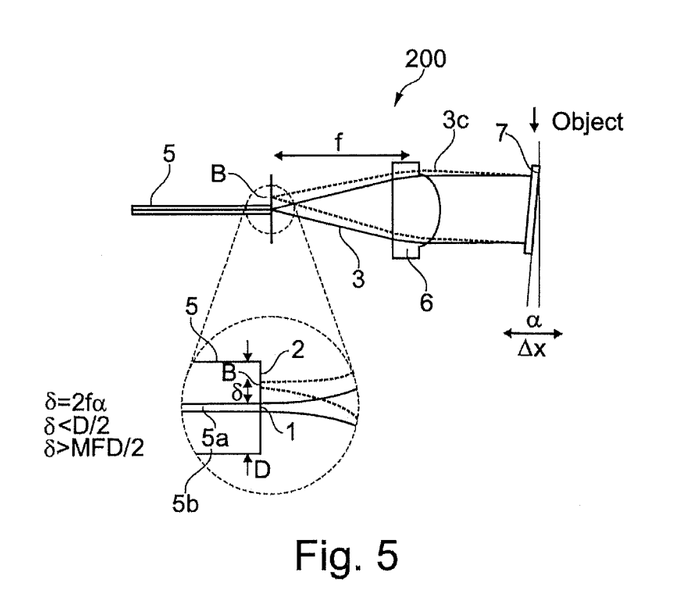
FIG. 5 is a schematic illustration of an exemplary embodiment of a confocal Fabry-Perot interferometer with a folding mirror.

FIG. 5 shows a second exemplary embodiment for a confocal Fabry-Perot interferometer 200 with the aid of which it is possible to achieve a measuring range $\Delta x_{max}$ which is not restricted by the focal length f, but only by structural factors (and can therefore be very large). The Fabry-Perot interferometer 200 is based on the idea of folding the beam path of the Fabry-Perot interferometer 100, shown in FIG. 4, at the middle vertical Y between the collimators 6 and 6'. The effect of the folding is that focal points of the confocal optics may always occur on non-moving (stationary) mirrors, and so the restriction of the measuring range of the Fabry-Perot interferometer 100 that was explained with the aid of FIG. 4 may be overcome. At the same time, the confocal property of the interferometer optics may be retained, that is to say the Fabry-Perot interferometer illustrated in FIG. 5 is a confocal interferometer 200.

The folding of the beam path 3, 3' of the confocal optics illustrated in FIG. 4 may be attained in the Fabry-Perot interferometer 200 by means of a plane folding mirror 7. The folding mirror 7 may be coupled in terms of movement to the object (not illustrated) whose position or change in position is to be determined. The beam path 3 of the light emerging from the optical fibre 5 and focused by the collimator 6 is transferred by the folding mirror 7 into the beam path 3c. It is assumed in this case that there is a tilting $\alpha$ of the folding mirror relative to the perpendicular to the optical axis of the Fabry-Perot interferometer 200. The light beam 3c reflected by the folding mirror 7 traverses the collimator 6 (which now acts in accordance with the collimator 6' in FIG. 4 for a second time and is focused onto the end surface of the optical fibre 5. An offset of $\delta = 2f\alpha$ may occur in this case between the two focal points (that is to say the axis of the core 5a and the image point B thereof on the end surface of the optical fibre 5). The beam path 3, 3c depicted in FIG. 5 therefore corresponds in FIG. 4 to the beam path 3 between the first resonator mirror 1 and the second resonator mirror 2. The end surface of the optical fibre 5 (as explained in yet more detail below, more precisely only the end surface of the cladding 5b of the optical fibre 5) implements the second resonator 2. The latter reflects the incident light and, in explicit terms, may send it back again into the core 5a of the optical fibre 5, via the same path via which it arrived (collimator 6, folding mirror 7, collimator 6).

FIG. 5 shows that the confocal property of the interferometer optics is independent of the tilt angle $\alpha$ as long as the image point B still strikes the end surface of the optical fibre 5. The diameter of the optical fibre 5 (that is to say its cladding diameter) is denoted by D. The condition $\delta < D/2$ thus may result for the offset $\delta$.

A typical, exemplary value for the diameter D of an optical fibre is D=125 μm. The condition for the maximum permissible tilt angle $\alpha$ is $\alpha < D/(4f)$. By way of example, $\alpha < 3.125$ mRAD results for f=10 mm.

It is easy to see that the required adjusting accuracy of the folding mirror 7 in the confocal Fabry-Perot interferometer 200 is relaxed by the factor D/MFD relative to the required adjusting accuracy of the second resonator mirror 2 in the (non-confocal) Fabry-Perot interferometer 20. The adjusting problem can ideally be diminished arbitrarily by a simple dimensioning of the fibre end of the optical fibre 5 (or a mirror fitted there).

As already explained, the condition $R_1 \approx R_2$ should hold for the attainment of a high contrast in the reflected light 4. This is fulfilled in the case of the implementation, shown in FIG. 5, of a confocal Fabry-Perot interferometer 200, since the reflection factor $R_1$ of the core 5a corresponds approximately to the reflection factor $R_2$ of the cladding 5b. For example, it holds that $R_1 \approx R_2 \approx 0.04$, that is say 4%. The folding mirror 7 then preferably has a high reflection factor $R_c$ of more than 0.9, in particular more than 0.95 or $R_c \sim 1.0$ (that is to say near 100%), in order to influence the light intensity as little as possible in the case of the two reflections. Owing to the high reflection factor $R_c$ of the folding mirror 7, the confocal Fabry-Perot interferometer 200 no longer functions for $\delta < MFD/2$, that is to say for the case, as in FIG. 2, when the image point B falls onto the exit surface of the core 5a. The point is that in this case the folding mirror 7 becomes the second resonator mirror, as a result of which the contrast of the interference pattern in the reflected light 4 in accordance with Equation (1) assumes a very low value close to zero.

Figure 6:
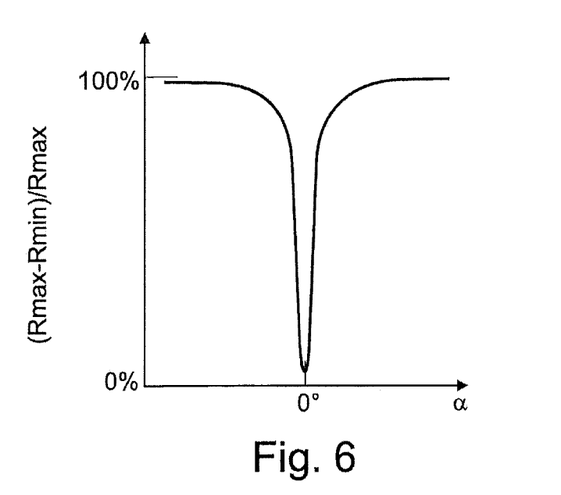
FIG. 6 is a graph illustrating the interference pattern contrast generated by the confocal Fabry-Perot interferometer shown in FIG. 5.

FIG. 6 illustrates the contrast of the interference pattern in the reflected light 4 as a function of the tilt angle $\alpha$ for the confocal Fabry-Perot interferometer 200. The curve is inverse to the curve shown in FIG. 3. In practice, this means that exactly the opposite requirement to that of the Fabry-Perot interferometer 20 exists with regard to the tilt angle $\alpha$: the folding mirror 7 must be tilted with a tilt angle $\alpha > MFD/(4f)$ relative to its "normal position", or be "deadjusted". This "deadjustment condition" according to FIG. 6 is substantially easier to ensure in practice than the adjustment condition according to FIG. 3.

In other words: the Fabry-Perot interferometer 20 illustrated in FIG. 2 can be converted into the confocal Fabry-Perot interferometer 200 by using conceivably simple measures: for example, all that is required is to replace the resonator mirror 2 of low reflection factor $R_2$ by the folding mirror 7 of preferably high reflection factor $R_c$, and deliberately prevent the axial adjustment of this mirror, which is difficult in any case. In addition, an increase in the accuracy by the factor 2 is achieved by doubling the optical path length in the interferometer resonator. Otherwise, reference is made to the description relating to FIG. 2, for the purpose of avoiding repetitions.

Figure 7:
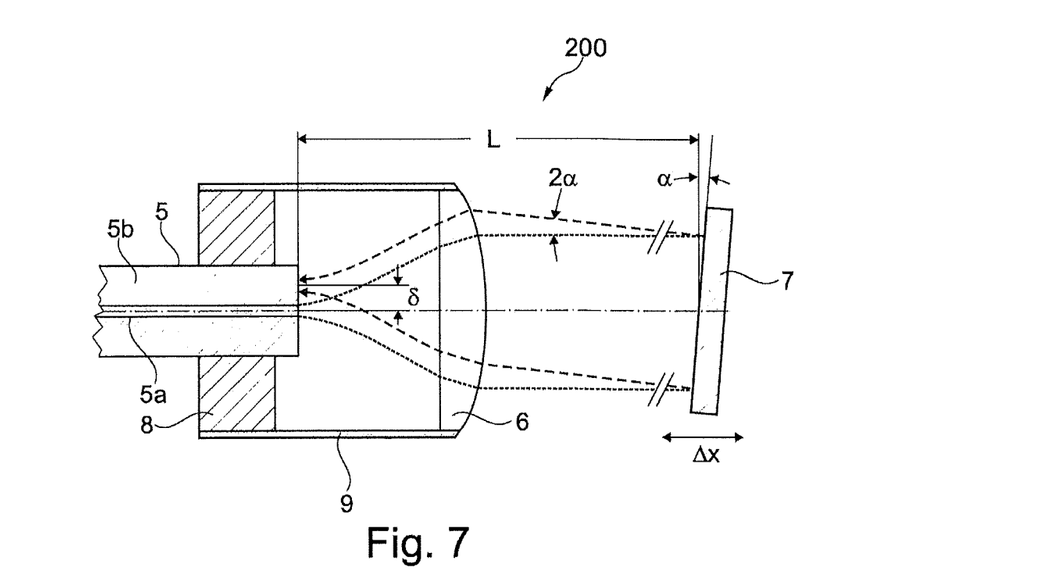
FIG. 7 is a diagrammatic illustration of the beam path of the confocal Fabry-Perot interferometer shown in FIG. 5 with a sufficiently tilted folding mirror.
Figure 8:
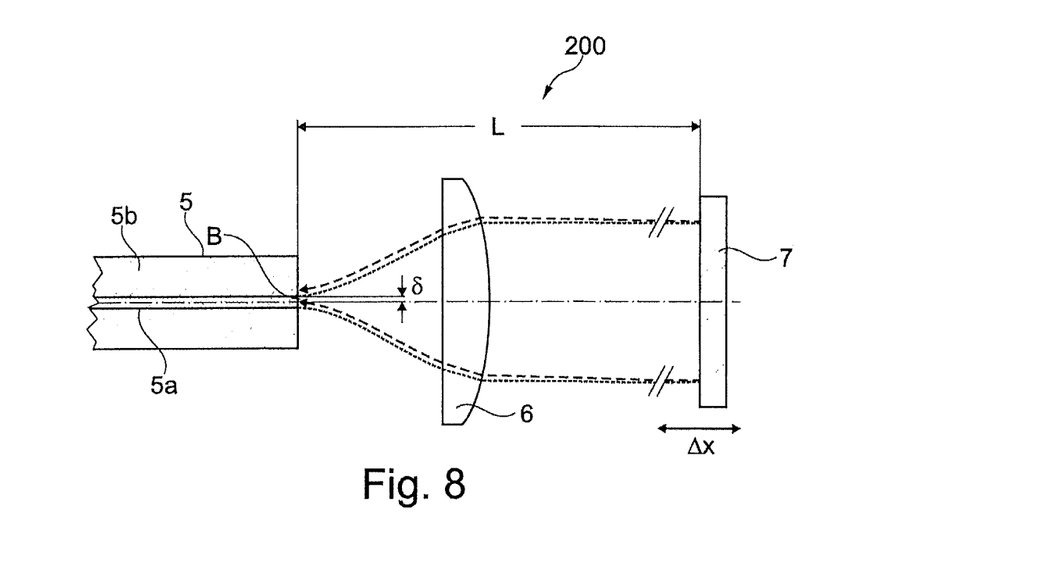
FIG. 8 is a diagrammatic illustration of the beam path of the confocal Fabry-Perot interferometer shown in FIG. 5, with an insufficiently tilted folding mirror.

FIGS. 7 and 8 show the beam path of the Fabry-Perot interferometer 200 for different tilt angles $\alpha$ in greater detail. The operating range with $\delta > MFD/2$ is illustrated in FIG. 7. The image point B lies outside the core 5a. Illustrated in FIG. 8 is the beam path for a very small tilting $\alpha$, in the case of which the image point B falls into the region of the core 5a, that is to say $\delta \leq MFD/2$. A clearer contrast loss is observed in this case—see FIG. 6.

It is possible to conceive many different possibilities for realizing the Fabry-Perot interferometer 200 illustrated in FIGS. 5 and 7 to 10. In all the exemplary embodiments, the end of the optical fibre 5 can be connected firmly to the collimator 6 via a fibre ferrule or a holder 8 and a housing 9. This yields a stable and robust design of the interferometer head consisting of the first resonator mirror 1 (here the exit surface of the core 5a), the second resonator mirror 2 (here the end surface of the cladding 5b) and the collimator 6. Spacing L between the end of the optical fibre 5 and the folding mirror 7 is restricted only by design limitations, and in the case of a given angle $\alpha$ can be enlarged virtually arbitrarily by enlarging the diameter of the collimator 6 and/or by enlarging the diameter D of the cladding 5b. Measuring ranges of more than 1 cm or even 10 cm and more are possible straight away. It is possible here in the case of the translation movement of the folding mirror 7 to accept a change in the tilt angle $\alpha$, for example owing to vibrations or the translation movement itself, as long as the condition $MFD/2 < \delta < D/2$ remains fulfilled. This enables the confocal Fabry-Perot interferometer 200 to be employed in multivarious fields of use.

Figure 9:
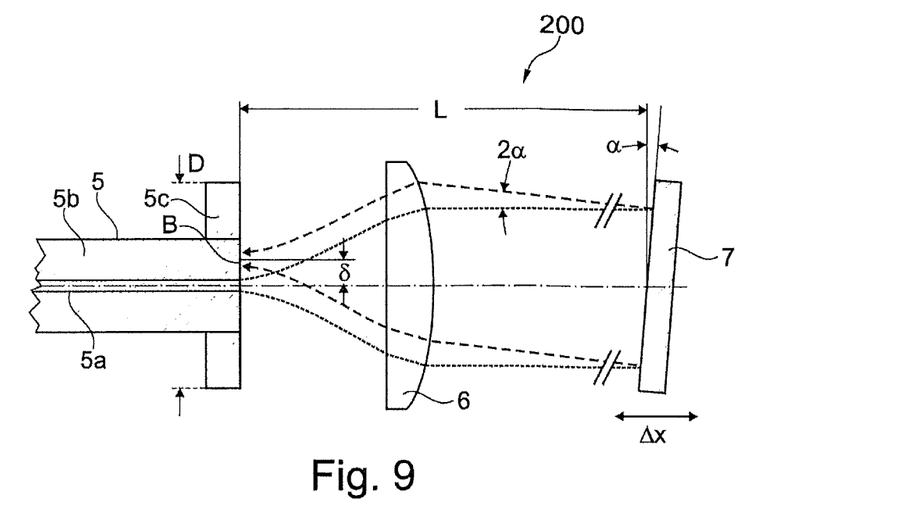
FIG. 9 is a diagrammatic illustration of another exemplary embodiment of the confocal Fabry-Perot interferometer according to FIG. 7.
Figure 10:
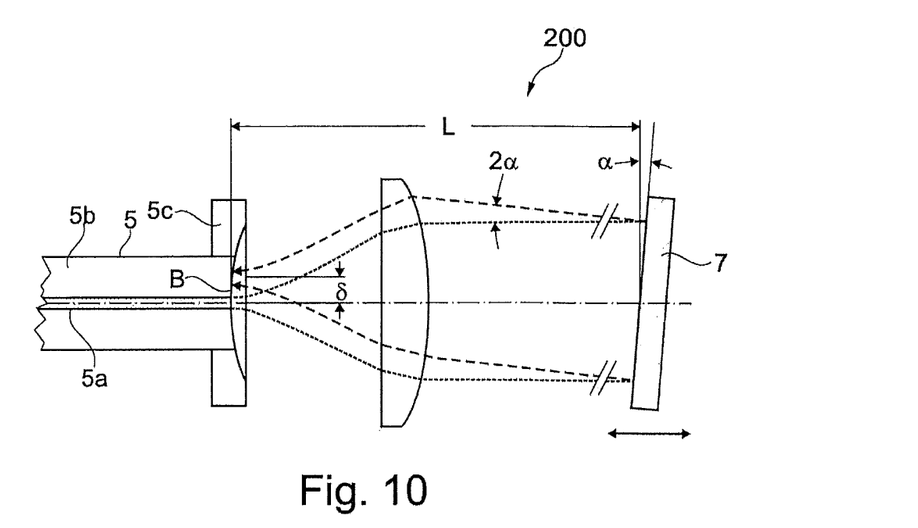
FIG. 10 is a diagrammatic illustration of another exemplary embodiment of the confocal Fabry-Perot interferometer according to FIG. 7.

FIGS. 9 and 10 show further variations of the Fabry-Perot interferometer 200. The fibre ferrule 8 and the optional housing 9 are not illustrated in FIGS. 9 and 10. According to FIG. 9, the effective diameter D of the cladding 5b can be enlarged by an optical part, for example an annular piece 5c. The optical annular piece 5c can be fabricated from the same material as the cladding 5b and have an annular surface which is coplanar with the end surface of the cladding 5b. The annular piece 5c therefore enlarges the reflecting surface of the second resonator mirror 2, that is to say the surface which is available for reflecting the image point B. The maximum permissible tilt $\alpha_{max}$=D/(4f) is further enlarged in this way.

In the previous exemplary embodiments, plane mirrors 1, 2, 7 were considered, by way of example. In accordance with FIG. 10, the end surface of the second resonator mirror 2 (that is to say, here, of the cladding 5b and also the surface, adjacent thereto, of the annular piece 5c, if present) can be provided with a spherical shape or cutout. The optical imaging accuracy of the confocal optics, and therefore the optical properties of the Fabry-Perot interferometer 200 are thereby improved. The two resonator mirrors 1, 2 can also have a curved shape.

A further design variant (not illustrated) of the confocal Fabry-Perot interferometer 200 is distinguished in that the first and/or the second resonator mirror(s) 1, 2 are/is not integral to the optical fibre 5, but are/is implemented as one or more separate optical elements. For example, the first and the second resonator mirrors 1, 2 can be implemented by one or more semitransparent mirror plates which is or are arranged in the beam path upstream of the collimator 6 and which is or are traversed by the measuring light emerging from the optical fibre 5. A radially inner and radially outer zone of this mirror plate (or two separate corresponding mirror elements) can from the first or the second resonator mirror 1, 2 and, for example, be metallized in different degrees (particularly when the reflection factor $R_c$ of the folding mirror is less than 100%, the reflection factor of the second resonator mirror 2 can be higher than that of the first). Furthermore, it is also possible, by adopting suitable measures, for the interferometer resonator to be traversed not only twice (there and back) but in 4-fold, 6-fold etc. fashion, there being in each case an increase in measuring accuracy by the factor of the extension of the light path in the resonator.

Figure 11:
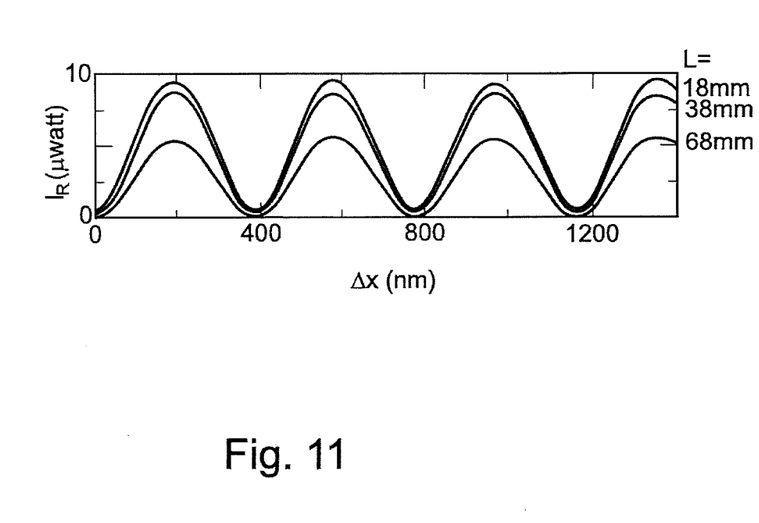
FIG. 11 is a diagrammatic illustration of a measuring arrangement, and a graph plotting measuring curves of the intensity of the light reflected by the confocal Fabry-Perot interferometer against the object position for three different path lengths.

In the right-hand area, FIG. 11 shows a diagram in which the intensity $I_R$ of the reflected light 4 is illustrated in units of μwatts in a plot against a change in path length Δx in units of nm. Three measuring curves are illustrated for L=18 mm, L=38 mm and L=68 mm. The measuring light of intensity $I_o$ was generated with the aid of a laser of wavelength λ=1550 nm. The focal length of the collimator 6 was f=8 mm, and the light beam 3 generated by the collimator 6 had a diameter of 1.5 mm. The path displacement Δx of the folding mirror 7 was accomplished by a piezo stack P. The measuring curves in FIG. 11 show that in the case of the reflection factors used here for the mirrors ($R_1$=$R_2$=0.04, Rc virtually 1) what is obtained are cosine-shaped $I_R$ curves, and the contrast is always virtually 100%, the amplitude decreasing with rising spacing L between the end of the optical fibre 5 and the folding mirror 7 (that is to say the object). A rough determination of the object position can therefore already be undertaken with the aid of the amplitude $I_R$ of the light 4 reflected by the Fabry-Perot interferometer 200.

Figure 12:
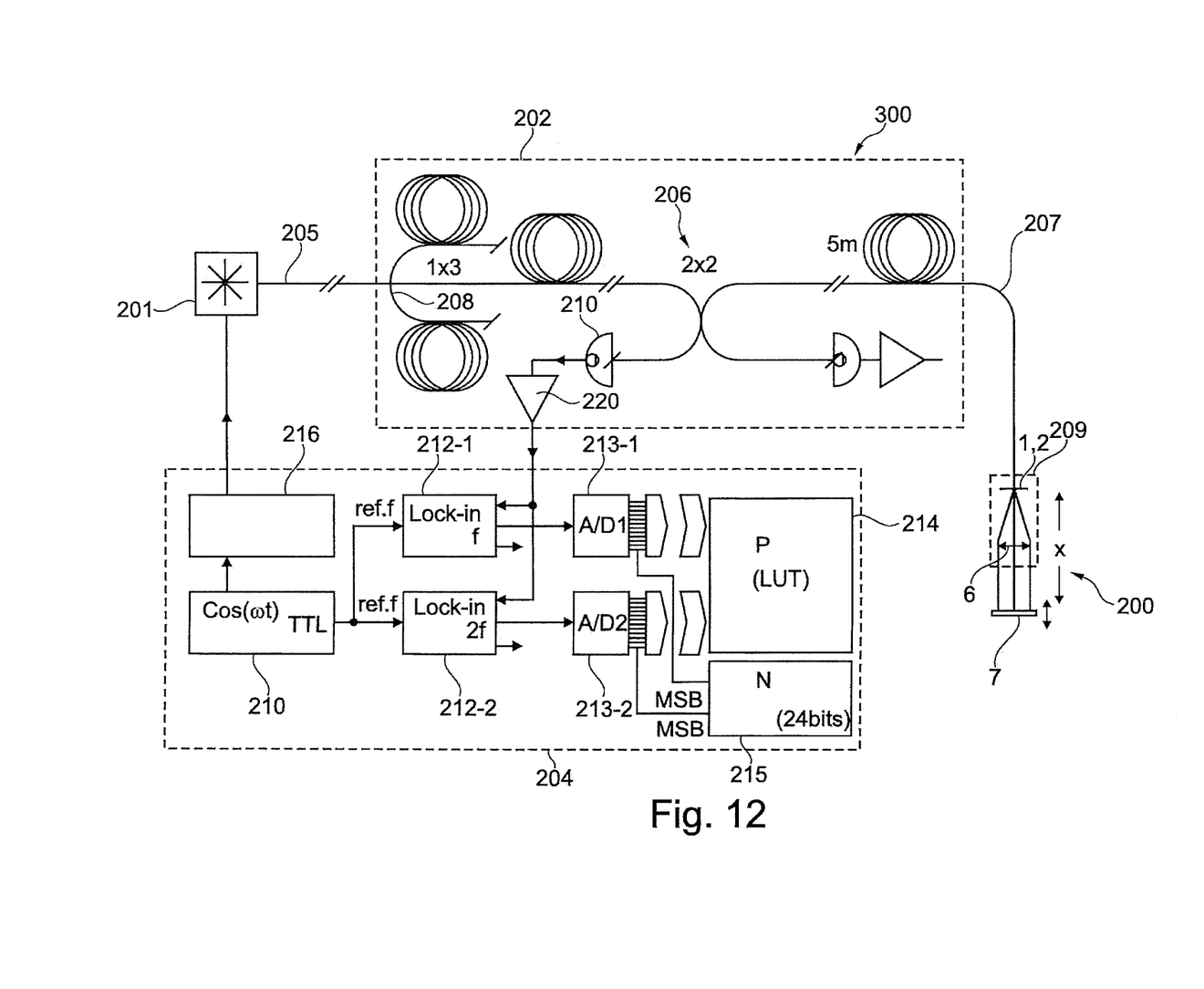
FIG. 12 is a diagrammatic illustration of an evaluation circuit in accordance with one exemplary embodiment.

FIG. 12 shows in an exemplary way a device 300 for acquiring position which uses the light 4 reflected by an inventive Fabry-Perot interferometer 100, 200 in order to determine the object position x. The device 300 for acquiring position which is shown here operates on the principle of quadrature detection, which is explained in more detail in European Patent Application Publication Number EP 2 045 572 A1, which is hereby added by reference to the content of the present application.

The intensity of the reflected light $I_R$ is proportional to the reflection factor of the Fabry-Perot interferometer which, with the (optional) assumption of a reflection factor of $R_c$=1.0 (100%) for the folding mirror 7, generally is given by the expression $$\text{reflection factor} = \frac{R_{min} + g^2 \sin^2\Phi}{1 + g^2 \sin^2\Phi}, \quad (4)$$

$$\text{where } \Phi = k(P+1)x \text{ with } k = \frac{2\pi}{\lambda},$$

P=folding factor (P=0<->no folding, P=1<->one folding mirror, etc.), and $g^2$=4R/(1−R)$^2$. Here, R denotes the effective reflection factor, which results from the reflection factor $R_1$ of the mirror 1 and the reflection factor $R_2$ of the mirror 2 in accordance with R=($R_1R_2$)$^{1/2}$.

The finesse F is determined by F=(πg/2)$^{1/2}$.
The result for the special case $R_1$=$R_2$=R is $$\text{reflection factor} = \frac{g^2 \sin^2\Phi}{1 + g^2 \sin^2\Phi}. \quad (5)$$

If $g^2$<<1, the denominator can be ignored to a first approximation, and the reflection factor of the Fabry-Perot interferometer fulfils the following proportionality $$\text{reflection factor} \approx g^2 \sin^2\Phi, (g^2<<1), \quad (6)$$

which is equivalent to $$\text{reflection factor} \approx g^2(1-\cos 2\Phi)/2. \quad (7)$$

It follows that for $R_1$=$R_2$=R and small values of R the intensity $I_R$ of the reflected light 4 is a signal having a variable component cos(2(P+1)kx) with k=2π/λ and P=folding factor (P=0<->no folding, P=1<->1 folding mirror, etc.), see FIG. 11, for example. As will be explained later on, such a signal is well suited for an evaluation.

The finesse F of the Fabry-Perot interferometer can, for example, be less than 10.0, 5.0, 1.0 or 0.5. The higher the value of the finesse F, the more difficult it becomes to evaluate signals on the basis of evaluation of the shape of the curve, since the cosine shape in accordance with Equation (7) is then no longer observed.

In order to achieve a low finesse F, at least one of the mirrors 1, 2, 7 can have a low reflection factor. Both in the region of the core 5a and in the region of the cladding 5b, the reflection factor of a plane polished end of an optical fibre 5 typically lies at about 4%, and therefore has the desired low reflectivity.

It is pointed out that the reflection factors of the resonator mirrors 1, 2 and of the folding mirror 7 can also be differently tuned to one another. A higher contrast of the interference pattern in the reflected light, that is to say $R_{min}$=0, should always be the target in this case, this condition being fulfilled, however, for (if appropriate, very) different values of $R_1$ and $R_2$ in the case of $R_c$≠100% and, in particular, given small values for $R_c$. It is possible, for example, to this extent for the exit surface of the core 5a (or of a first resonator mirror 1 separated from the optical fibre 5) and the end face of the cladding 5b (or of a second resonator mirror 2 separated from the optical fibre 5) to have different reflection factors, that is to say to be metallized to different degrees. Furthermore, instead of a small finesse F it is also possible to desire a large finesse of the Fabry-Perot interferometer 200, for example whenever the evaluation of the intensity $I_R$ is not based on the cosine shape of the intensity profile. This can be the case, for example, when there is no need for a high spatial resolution, and reflected light is, for example, evaluated solely by the periodicity of the interference pattern, but not by the profile of the curve between periodicity reference points (for example maxima) of $I_R$.

The device 300 for acquiring position comprises an interferometer head 209, a detector arrangement 202, an evaluation circuit 204 and a light source (laser) 201. Specific examples of these components are specified below.

The detector arrangement 202 can, for example, have on the input side a 1×M coupler 208 which provides M independent laser outputs. It is possible to select M=3 if, for example, the movement of the object is monitored in three dimensions. In this case, two further interferometric devices for acquiring position can be connected to the two free outputs of the 1×3 coupler 208.

One of the outputs of the 1×M coupler 208 is led to a 2×2 coupler 206. One output of the 2×2 coupler 206 is coupled into the interferometer head 209 via an SMF (Single Mode Fibre) 207. The interferometer head 209 can, for example, be implemented by one of the previously described confocal Fabry-Perot interferometer heads 100, 200.

The interference light of intensity $I_R$ returned by the interferometer head 209 via the SMF 207 is led to a detector 210. The detector 210 produces a measuring signal which is led to the evaluation circuit 204 after optional amplification in an amplifier 220.

Simple evaluation procedures are possible for applications in which high accuracies are not required. For example, it is possible to use a laser 201 with a fixed wavelength, and a detector signal, which corresponds to the intensity profile $I_R$ illustrated in FIG. 11 or else only has the periodicity thereof, can be evaluated directly. In addition to the possibility, already addressed, of evaluating the amplitude of a detector signal, obtained from the intensity profile $I_R$, with low accuracy of the determination of position, a simple possibility consists in evaluation of the curve periodicity, for example, by counting curve maxima (the accuracy is $(\lambda/2)/(P+1)$, where P=folding factor). Since the shape of the curve is not decisive for an evaluation of the curve periodicity, it is possible in this case, in particular, also to use confocal Fabry-Perot interferometers with a higher finesse F which supply a periodic but not cosine-shaped detector signal. The accuracy of $(\lambda/2)/(P+1)$ of an evaluation (solely) of the curve periodicity can be increased when the profile of the curve between the curve maxima (or other reference points used to determine the curve periodicity) is used for the evaluation. This can, for example, be carried out by comparison with curve values stored in advance, for example in a look-up table memory, and/or by interpolation.

By way of example, FIG. 12 is used below to describe a device 300 for acquiring position which carries out a very accurate determination of position based on a so-called quadrature detection method. The light source used here is a tuneable laser 201 with the aid of which the wavelength of the measuring light is periodically modulated, and the intensity $I_R$ of the light reflected by the confocal Fabry-Perot interferometer 100, 200 is evaluated according to the quadrature principle by means of demodulation as a function of the modulation frequency of the measuring light. It is possible in this way to determine position with accuracy in the nanometer range, and even in the sub-nanometer range over the entire measuring range.

The mathematical background will firstly be described briefly for the purpose of understanding the quadrature detection method. By a confocal Fabry-Perot interferometer 100, 200 of low finesse, the normalized detector signal is given by $$s = \cos[2(P+1)kx], \quad (8)$$

k being related via $k=2\pi/\lambda$ to the temporarily varying wavelength $\lambda$ of the tuneable laser 201. The modulation of the measuring light can be specified by $$k = k_0 + \delta k \cos(\omega t), \quad (9)$$

$k_0$ denoting a fixed wavenumber value, and $\delta k$ the modulation level. It follows from a derivation described in the application EP 2 045 572 A1 that the normalized measuring signal s can be specified by the sum of terms $$s = s_{DC} + s_\omega + s_{2\omega} \quad (10)$$

The term $s_{DC}$ is a time-independent component and is yielded as $$s_{DC} = \cos(2(P+1)k_0 x)[1-(2(P+1)x\delta k/2)^2] + s_0. \quad (11)$$

The second term $s_\omega$ is a time-dependent component which accomplishes a periodic, temporary oscillation with the modulation frequency f in accordance with $$s_\omega = \{-2(P+1)x\delta k \cos(\omega t)\} \sin(2(P+1)k_0 x), \quad (12)$$

where $\omega = 2\pi f$. The third term $s_{2\omega}$ is likewise a component which varies with time and constitutes a periodic oscillation with double the modulation frequency, that is to say 2f, $$s_{2\omega} = \{-(2(P+1)x\delta k/2)^2 \cos(2\omega t)\} \cos(2(P+1)k_0 x). \quad (13)$$

A quadrature evaluation can, for example, be performed by demodulating the two components $s_\omega$ and $s_{2\omega}$, which vary with time and have the frequencies f and 2f, respectively. The demodulated signals obtained by the demodulation are proportional to $$S = -2(P+1)x\delta k \sin(2(P+1)k_0 x) \quad (14)$$

and $$S_Q = -(2(P+1)x\delta k/2)^2 \cos(2(P+1)k_0 x). \quad (15)$$

The prefactors $2(P+1)x\delta k$ and $(2(P+1)x\delta k/2)^2$ of the signals S and $S_Q$ are unknown since they depend on the object location x, that is to say the value being sought.

The first step is then to determine an approximate value $x_{estim}$ for the object position. Subsequently, a higher accuracy can be attained by evaluating the quadrature detection signals $S \approx -2(P+1)x_{estim}\delta k \sin(2(P+1)k_0 x)$ and $S_Q \approx -(2(P+1)x_{estim}\delta k/2)^2 \cos(2(P+1)k_0 x)$ by an increment count and an interpolation. The use of these terms demodulated by quadrature detection yields the position x with a high accuracy which can be in the sub-nanometer range, specifically $$x = \frac{\lambda}{2(P+1)} \left[ N + \frac{1}{4} + \frac{1}{2\pi} \arccos\left( \frac{S}{\sqrt{S^2 + (2S_Q/2(P+1)x_{estim}\delta k)^2}} \right) \right] \quad (16)$$

Here, N denotes the counting value of the increments of $\lambda/[8(P+1)]$, which has been obtained during a displacement x from a reference point (zero point) $x_0$.

The determination of the approximate value $x_{estim}$ can be performed, for example, by measuring the maximum values $\max(S_Q)$ and $\max(S)$ of the signals $S_Q$ and S according to the Equation $x_{estim} \approx (2/\delta k)(\max(S_Q)/\max(S))$.

Such an evaluation of the detector signal supplied by the detector 220 can be carried out by means of the evaluation circuit 204 illustrated by way of example in FIG. 12. Said evaluation circuit comprises a first lock-in amplifier 212-1 and a second lock-in amplifier 212-2, a first analogue/digital converter 213-1, a second analogue/digital converter 213-2, a processor 214 with access to a look-up table memory, and an up/down counter 215. In addition, the evaluation circuit 204 comprises a laser driver 216 which is controlled via a signal output of an AC voltage generator 210. The laser driver 216 can undertake control of the temperature of the tuneable laser 201 and has the effect that the tuneable laser 201 carries out a wavelength modulation in accordance with $\lambda=\lambda_0+\delta\lambda\cos(\omega t)$ with high accuracy. The tuneable laser 201 can, for example, be a DFB (Distributed Feedback) laser operating, for example, with a central frequency of 1500 nm. The laser 201 can be isolated by using a Faraday isolator, for example with 35 db, in order to prevent its being damaged or becoming unstable owing to reflected light.

The demodulations of the measuring signal output by the detector 220 and having the angular frequency $\omega$ and the angular frequency $2\omega$ are carried out in the lock-in amplifiers 212-1 and 212-2, respectively. To this end, the reference inputs of the two lock-in amplifiers 212-1, 212-2 are connected to a TTL reference output of the AC voltage generator 210. The measuring signal output at the output of the detector 220 is fed into the signal inputs of the two lock-in amplifiers 212-1 and 212-2. The first lock-in amplifier 212-1 is set to the reference angular frequency $\omega$, and the second lock-in amplifier 212-2 is set to twice the reference angular frequency $2\omega$. The first lock-in amplifier 212-1, which is operated synchronously with $\omega$, produces a demodulated signal $S=-x\delta k \sin(2(P+1)k_0 x)$, and the second lock-in amplifier 212-2, which operates synchronously with the angular frequency $2\omega$, supplies a quadrature detection signal $S_Q=-(2(P+1)x\delta k/2)^2 \cos(2(P+1)k_0 x)$. Employing the optional condition $\delta\lambda \ll \lambda_0$, the factor $\delta k$ can be approximated by the expression $\delta k=-2\pi\lambda/(\lambda_0)^2$, $\delta\lambda$ specifying the known wavelength level of the wavelength modulation. The two output signals of the lock-in amplifiers 212-1, 212-2 are converted into digital signals by the analogue/digital converters 213-1, 213-2. A first readout at the output of the analogue/digital converters 213-1, 213-2 yields the displacement path x in increments of $\lambda/[8(P+1)]$. To this end, the most significant bit MSB at the output of each analogue/digital converter is respectively led to a counting input of the up/down counter. The position x is determined by the closest implement $x_N$ in accordance with $$x_N = \frac{\lambda}{2(P+1)}\left(N+\frac{1}{4}\right) \quad (17)$$

For example, a 24-bit counter with two counting inputs can be used as counter 215.

A second readout of the outputs of the analogue/digital converters 213-1, 213-2 is undertaken by the processor 214 in order to calculate $\delta x$ within an increment $\lambda/8$. This second readout can extend over the entire word width of the converter outputs. An interpolator included in the processor 214 processes the two demodulated signals S and $S_Q$ and determines $\delta x$ in accordance with the following relationship:

$$\delta x = \frac{\lambda}{4\pi(P+1)}\arccos\left(\frac{S}{\sqrt{S^2+(2S_Q/(2(P+1)x_{estim}\delta k)^2}}\right) \quad (18)$$

The value x is then determined by the sum of the output of the up/down counter 215 and interpolator in the processor 214 in accordance with $$x=x_N+\delta x. \quad (19)$$

Interpolation can be performed, for example, with the aid of a look-up table memory (LUT).

It may be pointed out that the quadrature detection method is capable of not necessarily being carried out on the basis of the signal components $s_\omega$ and $s_{2\omega}$, but can also, for example, be carried out with the aid of the DC component $s_{DC}$ and one of the signal components $s_\omega$ or $s_{2\omega}$. The point is that the DC component $s_{DC}$ is likewise dependent on x. In this case, one of the lock-in amplifiers 212-1, 212-2 can be omitted. The quadrature detection method is, however, always based on an evaluation of at least two signal components.

The device for acquiring position can be put into use in many applications and installation environments owing to its plurality of advantageous properties (high resolution, large measuring range, compactness of the interferometer head (design dimensions less than 1 cm, weight less than 1 g), simple installation, minimal or no outlay on optical adjustment, high resistance to vibration since no need for any stiff connecting lines). Use in extreme environments (LT, UHV, B, KV, T . . . ) is a particular possibility.

For example, the device for acquiring position can be used to monitor the positioning movement of a positioner with a positioning accuracy in the sub-millimeter range or in the sub-micrometer range or in the nanometer range, and even in the sub-nanometer range. An exemplary embodiment of a positioner 500 for translation movements with the aid of an inventive device for acquiring position is illustrated in top view in FIG. 13. The positioner 500 has a first, stationary part 501 and a second part, which can be displaced relative to the first part 501 and is denoted below as carrier 504. Active between the first part 501 and the carrier 504 is a device for adjusting relative position, which can, for example, be implemented by a translation axis 503, on which the carrier 504 can slide, and a piezo element 502 acting as actuator. The direction of the translation movement is illustrated by a double arrow P1.

Figure 13:
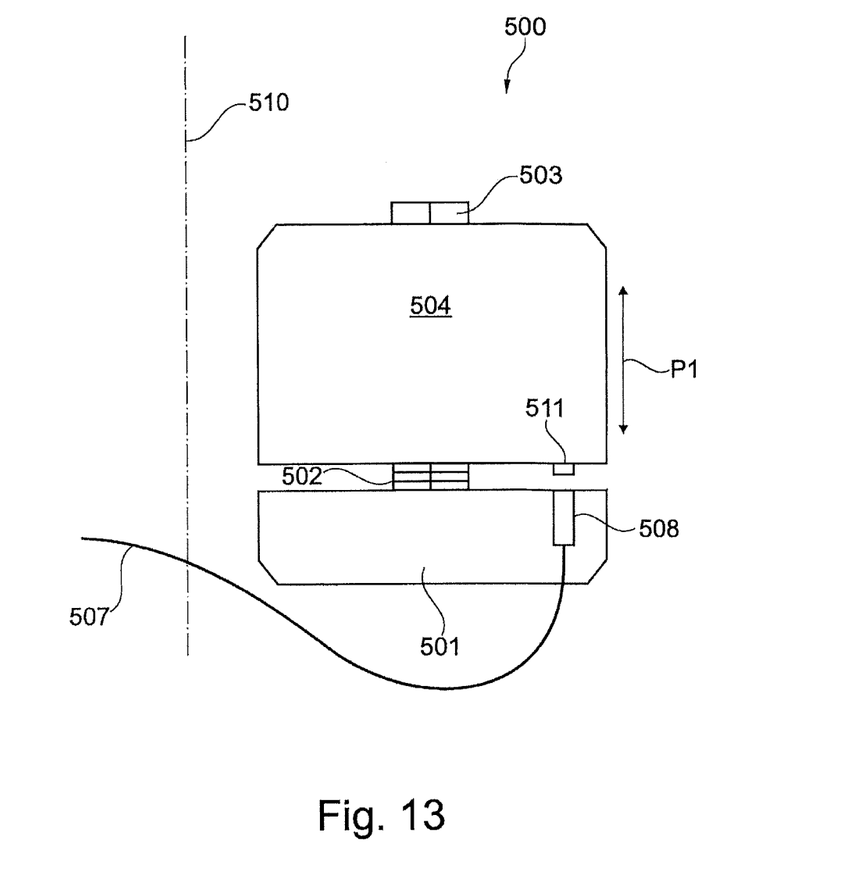
FIG. 13 is a diagrammatic illustration of an exemplary embodiment of a positioner for a translation movement.

The drive illustrated here is denoted as a so-called inertia motor or else as a slip-stick drive. In slip-stick drives, but also in other design types, the step width of a positioning movement cannot be defined exactly via the control of the drive. This means that the position of a positioning part, arranged on the carrier 504, in the positioner 500 cannot be determined solely by monitoring the drive control (for example by counting steps), but that the positioner 500 must additionally be equipped with a device which enables the positioning to be monitored.

To this end, a device for acquiring position is provided in accordance with one of the preceding exemplary embodiments. Held on the stationary first part 501 is an interferometer head 509 which can be designed in accordance with one of the preceding exemplary embodiments. The illuminating light emerging from the interferometer head 509 falls on a mirror 511 which is attached to the displaceable carrier 504 and is oriented perpendicular to the direction of movement (double arrow P1) and retroreflects the light to the interferometer head 503. The mirror 511 can, for example, be the folding mirror 7 or, in the case of the Fabry-Perot interferometer 100 shown in FIG. 4, also the second resonator mirror 2. The interferometer head 503 is connected via an optical fibre 507 to a detector arrangement (not illustrated) which can be designed in accordance with one of the preceding exemplary embodiments and is connected to the further previously described components (laser, evaluation circuit).

The dashed and dotted line 510 represents a system boundary such as can be implemented by a wall of a cryostat or another container, for example. It is to be seen that only the interferometer head 508 (without detector elements) need be accommodated within the closed system and—as illustrated in FIG. 13—can also optionally be integrated in a positioner 500. Consequently, the interferometer head 508 or the positioner 500 equipped with the interferometer head 508 can be used in extreme environments such as, for example, low temperature, ultra-high vacuum (UHV) or high electrical or magnetic fields in which the functionality of known devices for acquiring position and/or positioners is frequently not preserved in the desired way.

In the case of the translational positioner 500, it is possible to achieve an optical resolution of approximately 1 nm or even less. The step size can be varied between approximately 5 nm and 1 μm as a function of the voltage for controlling the piezo element 502, and as a function of the temperature. Owing to the high resolution of the optical position monitoring, it is therefore possible to achieve a positioning accuracy in the region of the mechanical boundaries of the drive (5 nm for example). Particularly advantageous for many applications is the long maximum movement path which can, as a rule, be from several millimeters up to one or more centimeters.

It may be pointed out that the above exemplary embodiments are exemplary, and that the disclosure content of this specification also covers the combinations of features which are described in different exemplary embodiments, to the extent that this is technically possible.

What is claimed is:

1. A device for acquiring a position, comprising:
  a confocal Fabry-Perot interferometer, the confocal Fabry-Perot interferometer including a first resonator reflective surface, a second resonator reflective surface, and a folding reflective surface arranged in a beam path between the first and the second resonator reflective surfaces, the first and second resonator reflective surfaces being provided in a fixed position relatively to one another independent from the position to be acquired, the first resonator reflective surface comprising an exit surface of a core of an optical fibre and the second resonator reflective surface comprising an end surface of an optical part, the end surface being arranged laterally next to the first resonator reflective surface.

2. The device of claim 1, wherein the folding reflective surface is coupled to an object.

3. The device of claim 1, wherein the confocal Fabry-Perot interferometer further comprises:
  a collimator arranged in the beam path between the first and the second resonator reflective surfaces.

4. The device of claim 1, wherein a reflection factor of the folding reflective surface is more than 0.9.

5. The device of claim 1, wherein the folding reflective surface is configured to reflect the beam path from the first resonator reflective surface to the second resonator reflective surface and from the second resonator reflective surface to the first resonator reflective surface.

6. The device of claim 1, wherein the first resonator reflective surface is arranged in a radially offset position to the second resonator reflective surface with respect to an optical axis of the beam path.

7. The device of claim 1, wherein a finesse of the confocal Fabry-Perot interferometer is less than 1.0.

8. The device of claim 1, wherein a first reflection factor of the first resonator reflective surface and a second reflection factor of the second resonator reflective surface are less than 0.15.

9. The device of claim 1, wherein a first reflection factor of the first resonator reflective surface and a second reflection factor of the second resonator reflective surface are about equal.

10. The device of claim 1, further comprising:
  a light source configured to generate a measuring light;
  a detector configured to produce a measuring signal; and
  an evaluation circuit configured to evaluate the measuring signal,
  wherein the light source is configured to be fed to the confocal Fabry-Perot interferometer, and
  the measuring signal is generated by the confocal Fabry-Perot interferometer.

11. The device of claim 10, wherein the measuring signal is an interference pattern.

12. The device of claim 1, the device being capable of carrying out a displacement measurement over a measuring range of more than 10-4 m.

13. The device of claim 3, wherein the first resonator reflective surface comprises:
  an exit surface of a core of an optical fibre,
  wherein the optical fibre being connected to the collimator via at least one of a fibre ferrule, a holder, and a housing.

14. The device of claim 1, further comprising:
  an annular piece having an annular surface,
  wherein the annular surface is coplanar with an end surface of the optical fibre.

15. The device of claim 14, wherein at least one of the resonator reflective surface and the annular surface is provided with a spherical shape.

16. An apparatus, comprising:
  a positioner; and
  the device of claim 1.

17. A method for acquiring a position, comprising:
  generating an interference pattern dependent on a position of an object by a confocal Fabry-Perot interferometer, the confocal Fabry-Perot interferometer including a first resonator reflective surface, a second resonator reflective surface, and a folding reflective surface arranged in a beam path between the first and the second resonator reflective surfaces, the first and second resonator reflective surfaces being provided in a fixed position relatively to one another independent from the position to be acquired, the first resonator reflective surface comprising an exit surface of a core of an optical fibre and the second resonator reflective surface comprising an end surface of an optical part, the end surface being arranged laterally next to the first resonator reflective surface;
  detecting the interference pattern to obtain a measuring signal; and
  evaluating the measuring signal.

18. A device for acquiring a position, comprising:
  a confocal Fabry-Perot interferometer, the confocal Fabry-Perot interferometer including a first resonator reflective surface and a second resonator reflective surface, the first and second resonator reflective surfaces being housed in a same structural unit, wherein the first resonator reflective surface and the second resonator reflective surface abut one another.

* * * * *

UNITED STATES PATENT AND TRADEMARK OFFICE
CERTIFICATE OF CORRECTION

PATENT NO. : 8,773,666 B2
APPLICATION NO. : 13/022901
DATED : July 8, 2014
INVENTOR(S) : Khaled Karrai et al.

It is certified that error appears in the above-identified patent and that said Letters Patent is hereby corrected as shown below:

In the Claims

Column 14, Line 28, In Claim 12, delete "10-4 m." and insert -- $10^{-4}$ m. --, therefor.

Signed and Sealed this
Fourth Day of November, 2014

Michelle K. Lee
*Deputy Director of the United States Patent and Trademark Office*